US009858135B2

(12) United States Patent
Huang

(10) Patent No.: US 9,858,135 B2
(45) Date of Patent: Jan. 2, 2018

(54) METHOD AND ASSOCIATED APPARATUS FOR MANAGING A STORAGE SYSTEM

(71) Applicant: Synology Incorporated, Taipei (TW)

(72) Inventor: Yi-Chan Huang, Taipei (TW)

(73) Assignee: Synology Incorporated, Taipei (TW)

( * ) Notice: Subject to any disclaimer, the term of this patent is extended or adjusted under 35 U.S.C. 154(b) by 83 days.

(21) Appl. No.: 15/133,247

(22) Filed: Apr. 20, 2016

(65) Prior Publication Data

US 2016/0357622 A1 Dec. 8, 2016

(30) Foreign Application Priority Data

Jun. 8, 2015 (TW) .............................. 104118454 A

(51) Int. Cl.
| | |
|---|---|
| *G06F 11/00* | (2006.01) |
| *G06F 11/07* | (2006.01) |
| *G06F 3/06* | (2006.01) |
| *H04L 12/26* | (2006.01) |
| *G06F 11/20* | (2006.01) |
| *H04L 29/08* | (2006.01) |

(52) U.S. Cl.
CPC ........ *G06F 11/0757* (2013.01); *G06F 3/0619* (2013.01); *G06F 3/0653* (2013.01); *G06F 3/0689* (2013.01); *G06F 11/079* (2013.01); *G06F 11/0727* (2013.01); *G06F 11/201* (2013.01); *H04L 43/0817* (2013.01); *H04L 43/10* (2013.01); *H04L 67/1097* (2013.01)

(58) Field of Classification Search
CPC ............. G06F 11/0757; G06F 11/0727; G06F 11/079; G06F 11/201; G06F 3/0653; H04L 43/10
See application file for complete search history.

(56) References Cited

U.S. PATENT DOCUMENTS

| | | | |
|---|---|---|---|
| 7,035,952 B2 | 4/2006 | Elliott | |
| 8,086,773 B2 | 12/2011 | Nakajima | |
| 8,281,071 B1 | 10/2012 | Vohra | |
| (Continued) | | | |

FOREIGN PATENT DOCUMENTS

| | | | |
|---|---|---|---|
| CN | 101594383 B | 5/2012 | |
| CN | 101276258 B | 12/2012 | |
| (Continued) | | | |

*Primary Examiner* — Michael Maskulinski
(74) *Attorney, Agent, or Firm* — Winston Hsu

(57) ABSTRACT

A method for managing a storage system and an associated apparatus are provided. The method includes: providing at least one heartbeat monitoring path between a set of expander control circuits within an expansion module in the storage system, for transmitting at least one of a plurality of heartbeat monitoring signals for a set of management modules in the storage system, wherein the expansion module is utilized for installing a set of shared storage devices, and each shared storage device within the set of shared storage devices is coupled to the set of expander control circuits, to allow the set of management modules to control the set of shared storage devices through the set of expander control circuits, respectively; and performing heartbeat monitoring according to the plurality of heartbeat monitoring signals, for at least one of the set of management modules to perform high availability management on shared storage devices.

20 Claims, 4 Drawing Sheets

(56) References Cited

U.S. PATENT DOCUMENTS

| | | | | |
|---|---|---|---|---|
| 2008/0244620 A1* | 10/2008 | Cagno | ................... | G06F 11/201 719/326 |
| 2012/0166724 A1 | 6/2012 | Smith | | |
| 2012/0284435 A1* | 11/2012 | Myrah | ................ | G06F 13/4022 710/74 |
| 2014/0229757 A1* | 8/2014 | Danayakanakeri | . | G06F 11/2038 714/4.11 |
| 2015/0039932 A1* | 2/2015 | Kaufmann | ............ | G06F 11/201 714/6.2 |
| 2015/0113340 A1 | 4/2015 | Gao | | |

FOREIGN PATENT DOCUMENTS

| | | |
|---|---|---|
| CN | 103488435 A | 1/2014 |
| EP | 1 796 003 A2 | 6/2007 |
| TW | 201019100 A1 | 5/2010 |

\* cited by examiner

METHOD AND ASSOCIATED APPARATUS FOR MANAGING A STORAGE SYSTEM

BACKGROUND OF THE INVENTION

1. Field of the Invention

The present invention relates to a high availability (HA) cluster, such as the high availability cluster of a data storage system adopting the Serial Attached Small Computer System Interface (Serial Attached SCSI or SAS) technique, and more particularly, to a method and apparatus for managing a storage system.

2. Description of the Prior Art

Network services have become essential to our daily lives. When there is a failure in a network service such as elements breaking down, user operation errors and system failure, this may interrupt service, potentially causing malfunctioning of the server, which increases the operating cost of the company.

Conventional high availability (HA) schemes to solve the above issues fail to provide stable service without introducing undesired side effects. For example, in a conventional high availability cluster, two servers are required to monitor each other. When the network is interrupted or unstable, the monitoring operations may make incorrect judgments, causing malfunction of the high availability cluster operation. This can be solved by providing an additional server to perform the monitoring operations, but this increases the overall cost.

In view of the above, there is a need for a novel method and related scheme to solve the aforementioned issue without introducing undesired side effects.

SUMMARY OF THE INVENTION

An objective of the present invention is to provide a method and apparatus for managing a storage system which can solve the issues of the related arts.

Another objective of the present invention is to provide a method and apparatus for managing a storage system which can save time and human resources used to configure, maintain or update the storage system, as well as preventing malfunctioning of the storage system.

Another objective of the present invention is to provide a method and apparatus for managing a storage system which can make a high availability (HA) cluster operate normally.

At least one preferred embodiment of the present invention provides a method for managing a storage system. The storage system comprises a plurality of shared storage devices. The method comprises: providing at least one heartbeat monitoring path between a first set of expander control circuits in a first expansion module, for transmitting at least one of a plurality of heartbeat monitoring signals for a set of management modules in the storage system, wherein the first expansion module is arranged to install a first set of shared storage devices within the plurality of shared storage devices, and the first set of shared storage devices are coupled to the first set of expander control circuits, respectively, to allow the set of management modules to control the first set of shared storage devices through the first set of expander control circuits, respectively; and performing heartbeat monitoring according to the plurality of heartbeat monitoring signals, for at least one of the set of management modules to perform high availability management operations on the plurality of shared storage devices, wherein the storage system is established as a high availability cluster.

In addition to the above method, the present invention also provides an apparatus for managing a storage system. The storage system comprises a plurality of shared storage devices. The apparatus comprises a first expansion module. The first expansion module is located in the storage system, and arranged to install a first set of shared storage device within the plurality of shared storage devices, wherein the first expansion module comprises: a first set of expander control circuits and at least one heartbeat monitoring path. The first set of expander control circuits are coupled to a set of management modules in the storage system, wherein the first set of shared storage devices are coupled to the first set of expander control circuits, respectively, to allow the set of management modules to control the first set of shared storage devices through the first set of expander control circuits, respectively. The heartbeat monitoring path is located between the first set of expander control circuits, and arranged to transmit at least one of a plurality of heartbeat monitoring signals for the set of management modules, wherein the apparatus performs heartbeat monitoring according to the plurality of heartbeat monitoring signals, for at least one of the set of management modules to perform high availability management operations on the plurality of shared storage devices, wherein the storage system is established as a high availability cluster.

The method and apparatus of the present invention may properly solve issues existing in the related arts without introducing undesired side effects. Further, the method and apparatus of the present invention may automatically establish the high availability cluster, which can save time and human resources used to configure, maintain or update the storage system, as well as preventing malfunctioning of the storage system. The high availability cluster may ensure sufficient storage space and maximize the system usage; this reduces the risk of unexpected interruptions and resource consumptions. By utilizing the method and apparatus of the present invention, additional cost and time for maintaining the storage system can be saved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
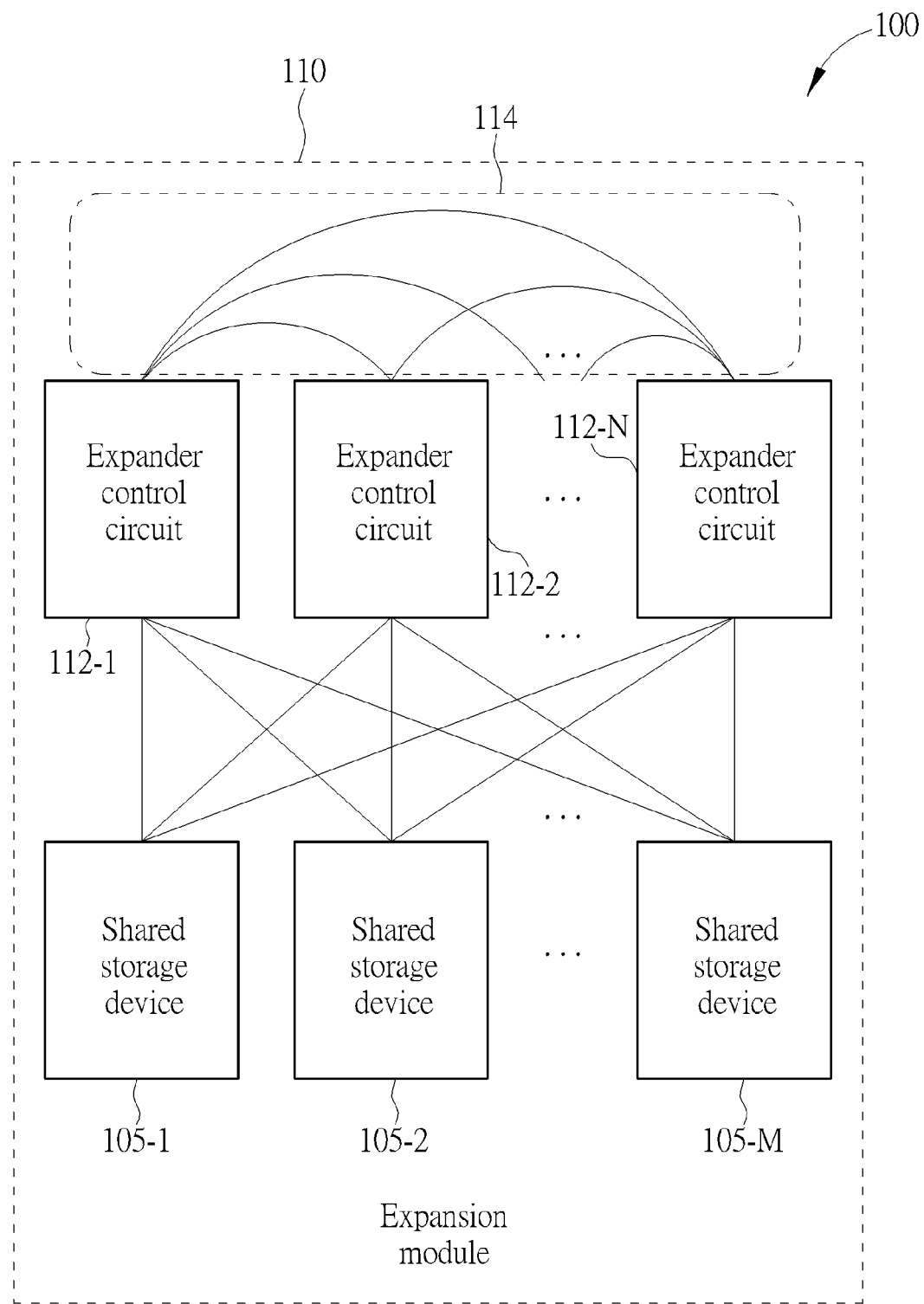
FIG. 1 is a diagram illustrating an apparatus for managing a storage system according to an embodiment of the present invention.

FIG. 1 is a diagram illustrating an apparatus 100 for managing a storage system according to an embodiment of the present invention, wherein the storage system comprises a plurality of shared storage devices (e.g. a plurality of hard disk drives). According to this embodiment, the apparatus 100 may comprise at least one portion (e.g. part or all) of a plurality of electronic devices in the storage system, and the plurality of shared storage devices (e.g. hard disk drives) may be installed in one or more electronic devices within the plurality of electronic devices. For example, the apparatus 100 may be one or more control circuits of some shared storage devices in the plurality of shared storage devices, such as one or more integrated circuits (ICs) in the aforementioned one or more electronic devices. In another example, the apparatus 100 may be the whole electronic device of the plurality of electronic devices. In another example, the apparatus 100 may be at least two electronic devices within the plurality of electronic devices. In another example, the apparatus 100 may be the whole storage system. Example of the storage system may comprise (but are not limited to): data storage system implemented with the Serial Attached Small Computer System Interface or SAS technique, and data storage system implemented with the SAS expander technique. Examples of the plurality of electronic devices may comprise (but are not limited to): headers and enclosures implemented with the SAS expander technique.

As shown in FIG. 1, the apparatus 100 comprises: an expansion module 110, located in the storage system, and arranged to install a set of shared storage devices {105-1, 105-2, ..., 105-M} within the plurality of shared storage devices, wherein the symbol "M" may represent a positive integer larger than 1. For example, the expansion module 110 may comprise: a set of expander control circuits {112-1, 112-2, ..., 112-N}, coupled to a set of management modules in the storage system, wherein the symbol "N" may represent a positive integer larger than 1; and at least one heartbeat monitoring path 114 (e.g. one or more heartbeat monitoring paths), located between the set of expander control circuits {112-1, 112-2, ..., 112-N}. More particularly, each shared storage device within the set of shared storage devices {105-1, 105-2, ..., 105-M} (wherein the symbol "m" may represent a positive integer within [1, M]) is coupled to the set of expander control circuits {112-1, 112-2, ..., 112-N}, to allow the set of management modules to control the set of shared storage devices {105-1, 105-2, ..., 105-M} through the set of expander control circuits {112-1, 112-2, ..., 112-N}, respectively. Further, the heartbeat monitoring path 114 may transmit at least one of a plurality of heartbeat monitoring signals (e.g. one or more heartbeat monitoring signals) for the set of management modules. In addition, the apparatus 100 may perform heartbeat monitoring of the set of management modules according to the plurality of heartbeat monitoring signals, for at least one of the set of management modules to perform high availability management operations upon the plurality of shared storage devices {105-1, 105-2, ..., 105-M}. The storage system may be established as a high availability cluster. More particularly, any of the set of management modules is equipped with capability of replacing another of the set of management modules, and each of the set of management modules is equipped with capability of independently controlling the plurality of shared storage devices.

Note that any management module within the set of management modules may be an example of the plurality of electronic devices, and the expansion module 110 may be another example of the plurality of electronic devices.

In practice, each management module within the set of management modules may be implemented as the header mentioned above according to the SAS expander technique, and any of the plurality of electronic devices except for the set of management modules (e.g. the expansion module 110) may be implemented as the enclosure mentioned above according to the SAS expander technique, wherein each expander control circuit within the set of expander control circuits {112-1, 112-2, ..., 112-N}, such as the expander control circuit 112-$n$ (wherein "n" represents a positive integer within [1, N]), may comprise at least one interface circuit, and the interface circuit may be implemented as a corresponding SAS interface circuit according to the SAS expander. Further, any expander control circuit of the first set of expander control circuits may be electrically connected to a corresponding management module within the set of management modules through a cable, such as an SAS cable.

According to this embodiment, the heartbeat monitoring path 114 between the set of expander control circuits {112-1, 112-2, ..., 112-N} is at least one internal wiring within the expansion module 110, rather than any network cable between the set of management modules. Hence, the apparatus 100 may avoid various issues which may occur in the related arts, such as the network cable is loosened, or the network cable breaks internally.

According to some embodiments, the storage system may comprise a plurality of replicas of the expansion module 110, such as a first expansion module 110-1 and a second expansion module 110-2. Each of the set of management modules may be implemented as the header mentioned above according to the SAS expander, and any of the plurality of electronic devices except for the set of management modules (e.g. the first expansion module 110-1, the second expansion module 110-2, etc.) may be implemented as the enclosure mentioned above according to the SAS expander.

Figure 2:
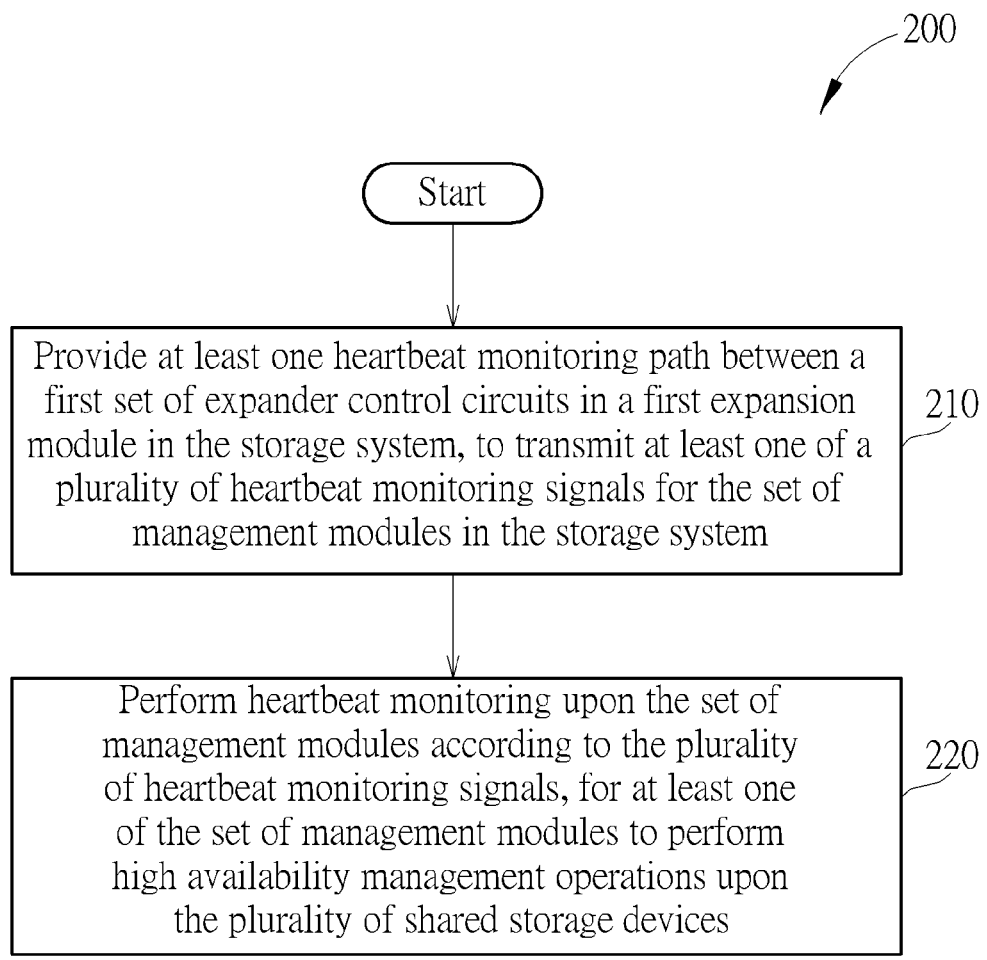
FIG. 2 is a flowchart illustrating a method for managing a storage system according to an embodiment of the present invention.

FIG. 2 is a flowchart illustrating a method 200 for managing a storage system according to an embodiment of the present invention. The method 200 may be applied to the apparatus 100 shown in FIG. 1, and more particularly, to the aforementioned expansion module 110 and/or replicas thereof (e.g. the first expansion module 110-1 and second expansion module 110-2, etc.). The method 200 is described as follows.

In Step 210, the apparatus 100 provides at least one heartbeat monitoring path between a first set of expander control circuits in the first expansion module 110-1 in the storage system, to transmit at least one of a plurality of heartbeat monitoring signals for the set of management modules in the storage system, wherein the first expansion module 110-1 is arranged to install a first set of shared storage devices within the plurality of shared storage devices (e.g. a first set of hard disk drives), and each shared storage device within the first set of shared storage devices is coupled to the first set of expander control circuits, to allow the set of management modules to control the first set of shared storage devices through the first set of expander control circuits, respectively.

For better understanding, the first set of expander control circuits may be an example of the set of expander control circuits {112-1, 112-2, ..., 112-N}, the heartbeat monitoring path mentioned in Step 210 may be an example of the heartbeat monitoring path 114, and the first set of shared storage devices may be an example of the set of shared storage devices {105-1, 105-2, ..., 105-M}.

In Step 220, the apparatus 100 performs heartbeat monitoring upon the set of management modules according to the plurality of heartbeat monitoring signals, for at least one of the set of management modules to perform high availability management operations upon the plurality of shared storage devices, wherein the storage system is established as a high availability cluster.

In practice, the set of management modules may comprise at least two (two or more) management modules, such as the headers HOST1 and HOST2 implemented with the SAS expander technique; and the first set of expander control circuits may comprise at least two expander control circuits, such as the expanders EXPANDER1 and EXPANDER2 implemented with the SAS expander technique. The first expansion module 110-1 may be implemented with the SAS expander enclosure, for installing the first set of expander control circuits and the first set of shared storage devices. In addition, the first set of expander control circuits (e.g. the expanders EXPANDER1 and EXPANDER2) may electrically connect to the set of management modules (e.g. the headers HOST1 and HOST2) through an SAS cable.

According to some embodiments, the number of the expansion modules may be larger than one. For example, the apparatus 100 may provide at least one heartbeat monitoring path between a second set of expander control circuits in the second expansion module 110-2 in the storage system, to transmit at least another of the plurality of heartbeat monitoring signals for the set of management modules in the storage system, wherein the second expansion module 110-2 is arranged to install a second set of shared storage devices (e.g. a second set of hard disk drives) within the plurality of shared storage devices, and each shared storage device within the second set of shared storage devices is coupled to the second set of expander control circuits, to allow the set of management modules to control the second set of shared storage devices through the second set of expander control circuits, respectively.

Note that the second set of expander control circuits may be another example of the set of expander control circuits {112-1, 112-2, . . . , 112-N}. For example, the heartbeat monitoring path provided between the second set of expander control circuits by the apparatus 100 may be an example of the heartbeat monitoring path 114, and the second set of shared storage devices may be another example of the set of shared storage devices {105-1, 105-2, . . . , 105-M}. The second set of expander control circuits may also comprise at least two expander control circuits, such as the replicas of the aforementioned expanders EXPANDER1 and EXPANDER2. The second expansion module 110-2 may also adopt the SAS expander enclosure to install the second set of expander control circuits and the second set of shared storage devices. In addition, the second set of expander control circuits (e.g. the replicas of the aforementioned expanders EXPANDER1 and EXPANDER2) may electrically connect to the first set of expander control circuits (e.g. the aforementioned expanders EXPANDER1 and EXPANDER2) through SAS cables, respectively.

According to some embodiments, the apparatus 100 may utilize a management module within the set of management modules to transmit a survival command to an expander control circuit within the first set of expander control circuits, so the expander control circuit can determine whether to notify another expander control circuit within the first set of expander control circuits of a survival state or a non-survival state of the management module. This allows another management module within the set of management modules to learn of whether the management module is in the survival state or the non-survival state via the other expander control circuit. The management module and the other management module may be the headers HOST1 and HOST2, respectively, and the expander control circuit and the other expander control circuit may be the expanders EXPANDER1 and EXPANDER2, respectively.

According to some embodiments, the apparatus 100 may utilize a management module within the set of management modules to transmit a reading command to an expander control circuit within the first set of expander control circuits. The reading command can inform the management module whether another management module within the set of management modules is in a survival state via the expander control circuit, another expander control circuit within the first set of expander control circuits, and a heartbeat monitoring path between the expander control circuit and the other expander control circuit, wherein the heartbeat monitoring path between the first set of expander control circuits may comprise the heartbeat monitoring path between the expander control circuit and the other expander control circuit. The management module and the other management module may be the headers HOST1 and HOST2, respectively, and the expander control circuit and the other expander control circuit may be expanders EXPANDER1 and EXPANDER2, respectively.

According to some embodiments, when an expander control circuit within the first set of expander control circuits receives a reading command from a corresponding management module within the set of management modules, the expander control circuit may set an output terminal of the expander control circuit as a first logic state, in order to notify another expander control circuit within the first set of expander control circuits of a survival state of the management module. This allows another management module within the set of management modules to learn of the survival state of the management module via the other expander control circuit. The management module and the other management module may be the headers HOST1 and HOST2, respectively, and the expander control circuit and the other expander control circuit may be the expanders EXPANDER1 and EXPANDER2, respectively. The expander control circuit may set the logic state (e.g. the aforementioned first logic state) of the output terminal by adjusting the voltage level of the output terminal. Since the means of utilizing the expander control circuit to set the logic state of the output terminal may be known by one skilled in the art, a detailed description thereof is omitted here for brevity.

According to some embodiments, when an expander control circuit within the first set of expander control circuits receives a reading command from a corresponding management module within the set of management modules, the expander control circuit may read a signal of an input terminal of the expander control circuit in order to learn of the logic state of an output terminal of another expander control circuit within the first set of expander control circuits set by the other expander control circuit, such as a first logic state or a second logic state (which is different from the first logic state) set by the other expander control circuit, wherein the logic state may indicate a survival state or a non-survival state of another management module within the set of management modules, and the input terminal of the expander control circuit is coupled to the output terminal of the other expander control circuit. The other expander control circuit may selectively set the output terminal of the other expander control circuit as the first logic state or the second logic state, to correspondingly indicate the survival state or the non-survival state of the other management module. The management module may refer to the signal read from the input terminal of the expander control circuit in order to learn of whether the other management module is in the survival state or the non-survival state, wherein the survival state and the non-survival state correspond to the first logic state and the second logic state, respectively. The management module and the other management module are the headers HOST1 and HOST2, respectively, and the expander control circuit and the other expander control circuit are the expanders EXPANDER1 and EXPANDER2, respectively.

According to some embodiments, when an expander control circuit within the first set of expander control circuits receives a survival command from a corresponding management module within the set of management modules, the expander control circuit may set an output terminal of the expander control circuit as a first logic state, to notify another expander control circuit within the first set of expander control circuits of a survival state of the management module. This allows another management module within the set of management modules to learn of the survival state of the management module through the other expander control circuit. The management module and the other management module are the headers HOST1 and HOST2, respectively, and the expander control circuit and the other expander control circuit are the expanders EXPANDER1 and EXPANDER2, respectively.

According to some embodiments, when the duration of an expander control circuit of the first set of expander control circuits not receiving a survival command from a corresponding management module within the set of management modules reaches a predetermined time threshold, the expander control circuit may set an output terminal of the expander control circuit as a second logic state different from the first logic state, to notify another expander control circuit within the first set of expander control circuits of a non-survival state of the management module. This allows another management module within the set of management modules to learn of the non-survival state of the management module via the other expander control circuit. The management module may periodically send the survival command to the corresponding expander control circuit within the first set of expander control circuits. The management module and the other management module may be the headers HOST1 and HOST2, respectively, and the expander control circuit and the other expander control circuit may be the expanders EXPANDER1 and EXPANDER2, respectively.

According to some embodiments, regarding any expander control circuit (e.g. any of the first set of expander control circuits) in the storage system, the default logic state of an output terminal arranged for indicating the survival/non-survival state of a specific management module is a second logic state, to simulate the non-survival state of this management module. In this way, when an issue occurs (e.g. electricity runs out, the firmware is abnormal, etc.), the output terminal of this expander control circuit will be in the second logic state. The management module is the header HOST1, and the expander control circuit is the expander EXPANDER1.

Figure 3:
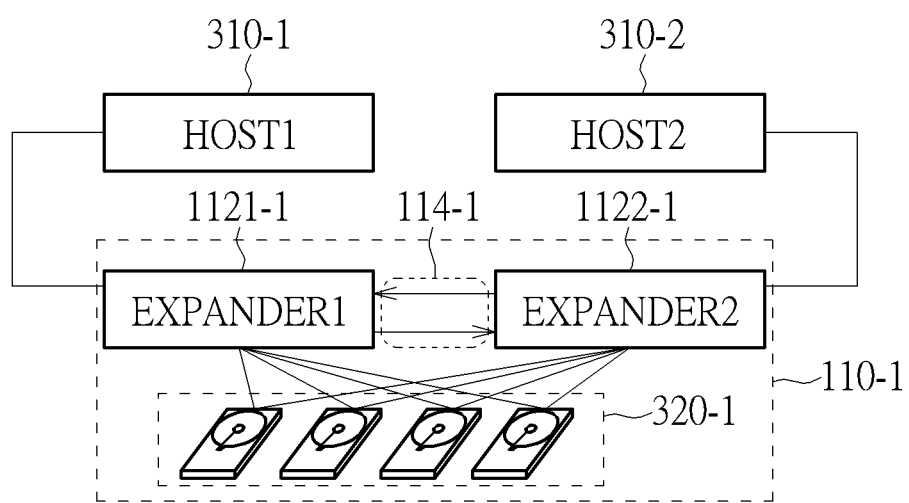
FIG. 3 is a diagram illustrating a control scheme associated with the method shown in FIG. 2 according to an embodiment of the present invention.

FIG. 3 is a diagram illustrating a control scheme associated with the method 200 shown in FIG. 2 according to an embodiment of the present invention. In FIG. 3, the management modules 310-1 and 310-2 (denoted as "HOST1" and "HOST2", respectively) may be implemented as the aforementioned headers HOST1 and HOST2, respectively, and may be an example of the set of management modules. Further, the expander control circuits 1121-1 and 1122-1 (denoted as "EXPANDER1" and "EXPANDER2", respectively) may be implemented as the aforementioned two expanders EXPANDER1 and EXPANDER2, and may be an example of the first set of expander control circuits. As shown in FIG. 3, the first expansion module 110-1 may be implemented as an enclosure for installing the expander control circuits 1121-1, 1122-1 and the first set of hard disk drives (such as the hard disk drives 320-1), wherein the expander control circuits 1121-1 and 1122-1 may electrically connect to the management modules 310-1 and 310-2 through the SAS cables, respectively.

According to this embodiment, the signal transmissions on the heartbeat monitoring path between the first set of expander control circuits may be performed by using a general purpose input output (GPIO) control unit in the expander control circuit 1121-1, a GPIO control unit in the expander control circuit 1122-1, a plurality of wirings between the GPIO control unit in the expander control circuit 1121-1, and the GPIO control unit in the expander control circuit 1122-1. The heartbeat monitoring paths 114-1 may be installed in a printed circuit board (PCB) of a first expansion module 110-1, such as the back panel of the first expansion module 110-1, wherein the expander control circuits 1121-1 and 1122-1 are coupled to this back panel. Note that the heartbeat monitoring paths 114-1 between the expander control circuits 1121-1 and 1122-1 are internal wirings in the first expansion module 110-1, rather than any network cable between the set of management modules (e.g. the management modules 310-1 and 310-2).

Since the cables between the headers HOST1, HOST2 and expanders EXPANDER1, EXPANDER2 are standard SAS cables, the heartbeat monitoring paths between the expanders EXPANDER1 and EXPANDER2 may be implemented as a simple and durable scheme, such as internal wirings between the expanders EXPANDER1 and EXPANDER2 and the input/output terminals at the two sides of the internal wirings (e.g. the respective input/output terminals of the expanders EXPANDER1 and EXPANDER2). Hence, the scheme shown in FIG. 3 is reliable for heartbeat monitoring, and may avoid issues existing in the related arts such as the network is so unstable that an additional server, hard disk drive and nonstandard wirings may be required. Some features in this embodiment which are similar to those in previous embodiments/modifications have been omitted here for brevity.

Figure 4:
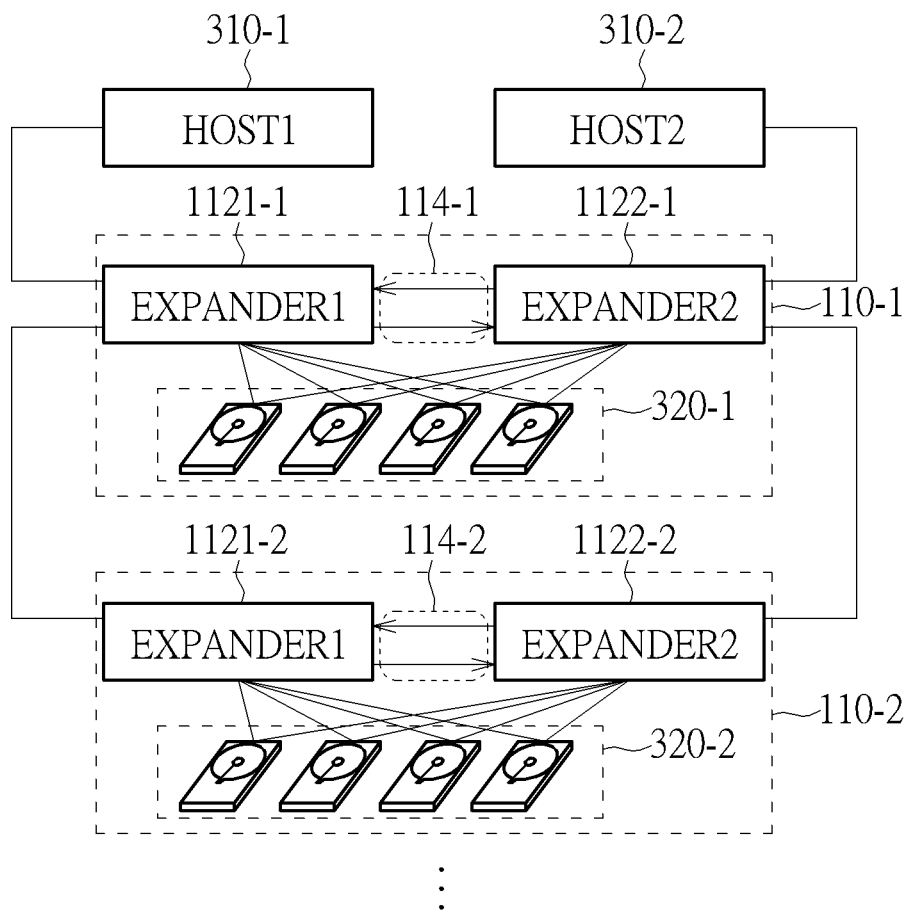
FIG. 4 is a diagram illustrating a control scheme associated with the method shown in FIG. 2 according to another embodiment of the present invention.

FIG. 4 is a diagram illustrating a control scheme associated with the method 200 shown in FIG. 2 according to another embodiment of the present invention, wherein the scheme shown in FIG. 4 may comprise the scheme shown in FIG. 3. In the scheme shown in FIG. 4, the expander control circuits 1121-2 and 1122-2 (denoted as EXPANDER1 and EXPANDER2, respectively) may be implemented as replicas of the aforementioned expanders EXPANDER1 and EXPANDER2, and may be an example of the second set of expander control circuits. As shown in FIG. 4, the second expansion module 110-2 in this embodiment may be implemented as an enclosure for installing the expander control circuits 1121-2 and 1122-2 and the second set of hard disk drives (such as the hard disk drives 320-2), wherein the expander control circuits 1121-2 and 1122-2 may electrically connect to the expander control circuits 1121-1 and 1122-1 through the SAS cables, respectively According to this embodiment, the signal transmissions on the heartbeat monitoring path between the second set of expander control circuits may be implemented by utilizing a GPIO control unit in the expander control circuit 1121-2, a GPIO control unit in the expander control circuit 1122-2, and a plurality of wirings between the GPIO control unit in the expander control circuit 1121-2 and the GPIO control unit in the expander control circuit 1122-2. The heartbeat monitoring paths 114-2 may be installed in a PCB of a second expansion module 110-2, such as the back board of the second expansion module 110-2, wherein the expander control circuits 1121-2 and 1122-2 are coupled to the back board. Note that the heartbeat monitoring paths 114-2 between the expander control circuits 1121-2 and 1122-2 are internal wirings in the second expansion module 110-2, rather than any network cable in the set of management modules (e.g. the management modules 310-1 and 310-2).

According to some embodiments, under the situation that the heartbeat monitoring paths 114 of the first expansion module 110-1 is abnormal, one management module within the set of management modules (e.g. the management modules 310-1 and 310-2) may monitor whether the other management module is in a survival state via the heartbeat monitoring paths 114-2 of the second expansion module 110-2.

According to some embodiments, under the situation that the heartbeat monitoring paths 114-1 of the first expansion module 110-1 is abnormal, any management module within the set of management modules (e.g. the management modules 310-1 and 310-2) may utilize the heartbeat monitoring paths of another expansion module (e.g. the second expansion module 110-2, or any follow-up expansion module) in the scheme shown in FIG. 4 to monitor whether the other management module within the set of management modules is in a survival state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a storage system, the storage system comprising a plurality of shared storage devices, the method comprising:
providing at least one heartbeat monitoring path between a first set of expander control circuits in a first expansion module in the storage system, for transmitting at least one of a plurality of heartbeat monitoring signals for a set of management modules in the storage system, wherein the first expansion module is arranged to install a first set of shared storage devices within the plurality of shared storage devices, and each shared storage device of the first set of shared storage devices is coupled to the first set of expander control circuits, to allow the set of management modules to control the first set of shared storage devices through the first set of expander control circuits, respectively;
performing heartbeat monitoring according to the plurality of heartbeat monitoring signals, for at least one of the set of management modules to perform high availability management operations on the plurality of shared storage devices, wherein the storage system is established as a high availability cluster; and
providing at least one heartbeat monitoring path between a second set of expander control circuits in a second expansion module in the storage system, to transmit at least another of the plurality of heartbeat monitoring signals for the set of management modules, wherein the second expansion module is arranged to install a second set of shared storage devices within the plurality of shared storage devices, and each shared storage device within the second set of shared storage devices is coupled to the second set of expander control circuits, to allow the set of management modules to control the second set of shared storage devices through the second set of expander control circuits, respectively.

2. The method of claim 1, wherein the step of performing heartbeat monitoring according to the plurality of heartbeat monitoring signals for at least one of the set of management modules to perform high availability management on the plurality of shared storage devices further comprises:
utilizing a management module within the set of management modules to transmit a survival command to an expander control circuit within the first set of expander control circuits, for the expander control circuit to determine whether to notify another expander control circuit within the first set of expander control circuits of a survival state or a non-survival state of the management module, to allow another management module within the set of management modules to learn of the survival state or the non-survival state of the management module via the other expander control circuit.

3. The method of claim 1, wherein the step of performing heartbeat monitoring according to the plurality of heartbeat monitoring signals for at least one of the set of management modules to perform high availability management operations on the plurality of shared storage devices further comprises:
utilizing a management module within the set of management modules to transmit a reading command to an expander control circuit of the first set of expander control circuits, to learn of a survival state or non-survival state of another management module within the set of management modules via the expander control circuit, another expander control circuit within the first set of expander control circuits, and a heartbeat monitoring path between the expander control circuit and the other expander control circuit, wherein the heartbeat monitoring path between the first set of expander control circuits comprises the heartbeat monitoring path between the expander control circuit and the other expander control circuit.

4. The method of claim 1, wherein the step of performing heartbeat monitoring according to the plurality of heartbeat monitoring signals for at least one of the set of management modules to perform high availability management operations on the plurality of shared storage devices further comprises:
when an expander control circuit within the first set of expander control circuits receives a reading command from a management module within the set of management modules, utilizing the expander control circuit to read a signal of an input terminal of the expander control circuit, to learn of a logic state of an output terminal of another expander control circuit within the first set of expander control circuits, the logic state set by the other expander control circuit, wherein the logic state indicates a survival state or a non-survival state of another management module within the set of management modules.

5. The method of claim 1, wherein the step of performing heartbeat monitoring according to the plurality of heartbeat monitoring signals for at least one of the set of management modules to perform high availability management operations on the plurality of shared storage devices further comprises:
when an expander control circuit within the first set of expander control circuits receives a survival command from a management module within the set of management modules, setting an output terminal of the expander control circuit as a first logic state to notify another expander control circuit within the first set of expander control circuits of a survival state of the management module, to thereby allow another management module within the set of management modules to learn of the survival state of the management module via the other expander control circuit.

6. The method of claim 1, wherein the step of performing heartbeat monitoring according to the plurality of heartbeat monitoring signals for at least one of the set of management modules to perform high availability management operations on the plurality of shared storage devices further comprises:
when an expander control circuit within the first set of expander control circuits does not receive a survival command from a corresponding management module within the set of management modules within a predetermined time threshold, setting an output terminal of the expander control circuit as a second logic state to notify another expander control circuit within the first set of expander control circuits of a non-survival state of the management module, to thereby allow another management module within the set of management modules to learn of the non-survival state of the management module via the other expander control circuit.

7. The method of claim 1, wherein an expander control circuit within the first set of expander control circuits is electrically connected to a management module within the set of management modules through a cable, and another expander control circuit within the first set of expander control circuits is electrically connected to another management module within the set of management modules through another cable.

8. The method of claim 1, wherein any of the set of management modules is equipped with capability of replacing another of the set of management modules, and each of the set of management modules is equipped with capability of independently controlling the plurality of shared storage devices.

9. The method of claim 1, wherein the heartbeat monitoring path between the first set of expander control circuits is at least one internal wiring in the first expansion module, rather than any network cable between the set of management modules.

10. An apparatus for managing a storage system, the storage system comprising a plurality of shared storage devices, the apparatus comprising:
a first expansion module, located in the storage system, and arranged to install a first set of shared storage device within the plurality of shared storage devices, wherein the first expansion module comprises:
a first set of expander control circuits, coupled to a set of management modules in the storage system, wherein each of the first set of shared storage devices is coupled to the first set of expander control circuits, to allow the set of management modules to control the first set of shared storage devices through the first set of expander control circuits, respectively; and
at least one heartbeat monitoring path, located between the first set of expander control circuits, and arranged to transmit at least one of a plurality of heartbeat monitoring signals for the set of management modules, wherein the apparatus performs heartbeat monitoring according to the plurality of heartbeat monitoring signals, for at least one of the set of management modules to perform high availability management operations on the plurality of shared storage devices, wherein the storage system is established as a high availability cluster; and
a second expansion module, located in the storage system, and arranged to install a second set of shared storage device within the plurality of shared storage devices, wherein the second expansion module comprises:
a second set of expander control circuits, coupled to the first set of expander control circuits, wherein the second set of shared storage devices is coupled to the second set of expander control circuits, to allow the set of management modules to control the second set of shared storage devices through the second set of expander control circuits, respectively; and
at least one heartbeat monitoring path, located between the second set of expander control circuits, and arranged to transmit at least another of the plurality of heartbeat monitoring signals for the set of management modules.

11. The apparatus of claim 10, wherein the apparatus utilizes a management module within the set of management modules to transmit a survival command to an expander control circuit within the first set of expander control circuits, for the expander control circuit to determine whether to notify another expander control circuit within the first set of expander control circuits of a survival state or a non-survival state of the management module, to allow another management module within the set of management modules to learn of the survival state or the non-survival state of the management module via the other expander control circuit.

12. The apparatus of claim 10, wherein the apparatus utilizes a management module within the set of management modules to transmit a reading command to an expander control circuit within the first set of expander control circuits, to learn of whether another management module within the set of management modules is in a survival state or a non-survival state via the expander control circuit, another expander control circuit within the first set of expander control circuits, and a heartbeat monitoring path between the expander control circuit and the other expander control circuit, wherein the heartbeat monitoring path between the first set of expander control circuits comprises the heartbeat monitoring path between the expander control circuit and the other expander control circuit.

13. The apparatus of claim 10, wherein when an expander control circuit within the first set of expander control circuits receives a reading command from a management module within the set of management modules, the expander control circuit reads a signal of an input terminal of the expander control circuit, to learn of a logic state of an output terminal of another expander control circuit within the first set of expander control circuits, the logic state set by the other expander control circuit, wherein the logic state indicates a survival state or a non-survival state of another management module within the set of management modules.

14. The apparatus of claim 10, wherein when an expander control circuit within the first set of expander control circuits receives a survival command from a management module within the set of management modules, the expander control circuit sets an output terminal of the expander control circuit as a first logic state to notify another expander control circuit within the first set of expander control circuits of a survival state of the management module, to thereby allow another management module within the set of management modules to learn of the survival state of the management module via the other expander control circuit.

15. The apparatus of claim 10, wherein when an expander control circuit within the first set of expander control circuits does not receive a survival command from a management module within the set of management modules within a predetermined time threshold, the expander control circuit sets an output terminal of the expander control circuit as a second logic state to notify another expander control circuit within the first set of expander control circuits of a non-survival state of the management module, to thereby allow another management module within the set of management modules to learn of the non-survival state of the management module via the other expander control circuit.

16. The apparatus of claim 10, wherein an expander control circuit within the first set of expander control circuits is electrically connected to a management module within the set of management modules through a cable, and another expander control circuit within the first set of expander control circuits is electrically connected to another management module within the set of management modules through another cable.

17. The apparatus of claim 10, wherein any of the set of management modules is equipped with capability of replacing another of the set of management modules, and each of the set of management modules is equipped with capability of independently controlling the plurality of shared storage devices.

18. The apparatus of claim 10, wherein the heartbeat monitoring path between the first set of expander control circuits is at least one internal wiring in the first expansion module, rather than any network cable between the set of management modules.

19. A method for managing a storage system, the storage system comprising a plurality of shared storage devices, the method comprising:
providing at least one heartbeat monitoring path between a first set of expander control circuits in a first expansion module in the storage system, for transmitting at least one of a plurality of heartbeat monitoring signals for a set of management modules in the storage system, wherein the first expansion module is arranged to install a first set of shared storage devices within the plurality of shared storage devices, and each shared storage device of the first set of shared storage devices is coupled to the first set of expander control circuits, to allow the set of management modules to control the first set of shared storage devices through the first set of expander control circuits, respectively; and
performing heartbeat monitoring according to the plurality of heartbeat monitoring signals, for at least one of the set of management modules to perform high availability management operations on the plurality of shared storage devices, wherein the storage system is established as a high availability cluster;
wherein the step of performing heartbeat monitoring according to the plurality of heartbeat monitoring signals for at least one of the set of management modules to perform high availability management operations on the plurality of shared storage devices further comprises:
utilizing a management module within the set of management modules to transmit a reading command to an expander control circuit of the first set of expander control circuits, to learn of a survival state or non-survival state of another management module within the set of management modules via the expander control circuit, another expander control circuit within the first set of expander control circuits, and a heartbeat monitoring path between the expander control circuit and the other expander control circuit, wherein the heartbeat monitoring path between the first set of expander control circuits comprises the heartbeat monitoring path between the expander control circuit and the other expander control circuit.

20. An apparatus for managing a storage system, the storage system comprising a plurality of shared storage devices, the apparatus comprising:
a first expansion module, located in the storage system, and arranged to install a first set of shared storage device within the plurality of shared storage devices, wherein the first expansion module comprises:
a first set of expander control circuits, coupled to a set of management modules in the storage system, wherein each of the first set of shared storage devices is coupled to the first set of expander control circuits, to allow the set of management modules to control the first set of shared storage devices through the first set of expander control circuits, respectively; and
at least one heartbeat monitoring path, located between the first set of expander control circuits, and arranged to transmit at least one of a plurality of heartbeat monitoring signals for the set of management modules, wherein the apparatus performs heartbeat monitoring according to the plurality of heartbeat monitoring signals, for at least one of the set of management modules to perform high availability management operations on the plurality of shared storage devices, wherein the storage system is established as a high availability cluster;
wherein the apparatus utilizes a management module within the set of management modules to transmit a reading command to an expander control circuit within the first set of expander control circuits, to learn of whether another management module within the set of management modules is in a survival state or a non-survival state via the expander control circuit, another expander control circuit within the first set of expander control circuits, and a heartbeat monitoring path between the expander control circuit and the other expander control circuit, wherein the heartbeat monitoring path between the first set of expander control circuits comprises the heartbeat monitoring path between the expander control circuit and the other expander control circuit.

* * * * *